United States Patent [19]

Ito et al.

[11] Patent Number: 4,574,756
[45] Date of Patent: Mar. 11, 1986

[54] DIESEL FUEL INJECTION PUMP WITH SIGNAL ROTOR GIVING REFERENCE POSITION AND ROTATION POSITION SIGNALS

[75] Inventors: Yoshiyasu Ito; Fumiaki Kobayashi; Hideo Miyagi, all of Toyota, Japan

[73] Assignee: Toyota Jidosha Kabushiki Kaisha, Toyota, Japan

[21] Appl. No.: 650,180

[22] Filed: Sep. 13, 1984

[30] Foreign Application Priority Data

Dec. 9, 1983 [JP] Japan ................. 58-232574

[51] Int. Cl.⁴ .............................. F02M 39/00
[52] U.S. Cl. .................... 123/357; 123/506; 123/500; 123/414; 73/119 A
[58] Field of Search ............... 123/357, 358, 359, 506, 123/500, 501, 414, 503; 73/119 A

[56] References Cited

U.S. PATENT DOCUMENTS

| | | | |
|---|---|---|---|
| 4,158,305 | 6/1979 | Shipley | 73/119 A |
| 4,355,613 | 10/1982 | Rode | 123/414 |
| 4,372,266 | 2/1983 | Hiyama | 123/357 |
| 4,378,695 | 4/1983 | Oshizawa | 73/119 A |
| 4,395,987 | 8/1983 | Kobayashi | 123/506 |

FOREIGN PATENT DOCUMENTS 2061403 5/1981 United Kingdom ............... 123/506

*Primary Examiner*—Carl Stuart Miller
*Attorney, Agent, or Firm*—Kenyon & Kenyon

[57] ABSTRACT

In a fuel injection system incorporating a distribution type fuel injection pump, wherein the amount of fuel in each fuel injection is controlled by the time duration from the stoppage to the resumption of the venting or spilling of the pumping chamber, the time duration is electronically calculated according to engine rotational speed and accelerator pedal opening amount as a rotational angle of the crankshaft. The value of the rotational angle is divided by a unit rotational angle of the crankshaft, as detected by a signal pickup from a signal rotor which rotates with an input shaft of the pump to obtain a quotient of an integer and a fractional remainder, and the rotational angle is measured by first counting the number of times that the crankshaft rotates through successive unit rotational angles equal to the integer of the quotient and, secondly, by adding a time equal to the product of the fractional remainder and a unit time which is equal to the time for the crankshaft to rotate through the unit rotational angle at the current engine rotational speed.

3 Claims, 7 Drawing Figures

DIESEL FUEL INJECTION PUMP WITH SIGNAL ROTOR GIVING REFERENCE POSITION AND ROTATION POSITION SIGNALS

BACKGROUND OF THE INVENTION

The present invention relates to a fuel injection pump for a diesel engine, and more particularly relates to an electromagnetic type of diesel fuel injection pump in which fuel spilling is controlled electronically by an electromagnetic valve rather than mechanically by the use of a spill ring or the like.

There is known a type of fuel injection pump for a diesel internal combustion engine which includes a plunger which reciprocates to and fro in a bore defined in a housing, a high pressure chamber being defined between one end of the plunger and the end of the bore. During the suction stroke of the plunger as this high pressure chamber expands in size, diesel fuel is sucked into this high pressure chamber from a quantity of diesel fuel contained in a relatively low pressure chamber, through a fuel supply passage; and during the compression stroke of the plunger as the high pressure chamber subsequently contracts in size, this diesel fuel in the high pressure chamber is squeezed and is brought to a high pressure and is ejected through an injection passage therefor to a fuel injector of the diesel internal combustion engine. Sometimes, in the case that the diesel fuel injection pump is so called distribution type pump, the plunger is rotated as it reciprocates by an input shaft which is rotationally coupled to it although not axially coupled to it, and by a per se well known construction the spirt of highly compressed diesel fuel is directed to the appropriate one of the plurality of cylinders of the internal combustion engine. It is known for the reciprocation of the plunger to be performed by having a cam plate fixedly mounted on the end of said plunger remote from the high pressure chamber and rotating with it. The cam plate is formed with at least one cam protuberance, and a mounting member is mounted to the pump housing so as to oppose the cam plate with at least one roller mounted to this mounting member so as to contact the cam plate. The combination of the cam plate and the plunger is biased towards the roller so as to be pressed against it and so as to cause said plunger to be reciprocated as it rotates by the cam action of the cam protuberance on the roller.

Now, such a fuel injection pump injects an amount of diesel fuel in each pump stroke which is regulated by a fuel injection amount control means which selectively vents the high pressure chamber. This control means ceases to vent the high pressure chamber when it is appropriate to start the fuel injection spirt, during the compression stroke of the plunger, and at this instant the almost incompressible diesel fuel in the high pressure chamber starts to be squeezed and injected, as explained above. When it is appropriate to terminate the fuel injection spirt, then the control means starts again to vent the high pressure chamber, and at this instant the diesel fuel in the high pressure chamber ceases to be squeezed and therefore the injection is immediately stopped. It has been conventional for this high pressure chamber selective venting means to be a spill ring, which is mechanically positioned according to the position of the accelerator pedal which is controlling the engine, and whose position controls the timing instant of the end of the non-vented time period of the high pressure chamber. However, nowadays electronically controlled fuel injection pumps are coming into use, in which the selective venting of the high pressure chamber is performed electronically by an electromagnetic valve which is controlled by an electronic control system such as one incorporating a microcomputer.

In such an electronic fuel injection pump, the electronic control system, for each spirt of fuel injection, calculates how much fuel is to be injected in this spirt, and then at an appropriate time point for the start of fuel injection closes said electromagnetic valve, so as to terminate fuel spilling from the high pressure chamber and so as thereby to start fuel injection. After the electronic control system has calculated that the proper amount of fuel has been injected by the movement of the plunger in the direction to reduce the size of the high pressure chamber, then said control system opens said electromagnetic valve for fuel spilling again, thus immediately terminating fuel injection.

Conventionally, in order for the electronic control system to receive information as to the position of the crankshaft of the diesel engine, in other words as to what point in its cycle the diesel engine has reached, so that the electronic control system may start the fuel injection at the appropriate timing point, there has been provided a signal rotor fixedly mounted on the input shaft of the fuel injection pump, with a signal generator being mounted so as to oppose an outer peripheral portion of the signal rotor, and with a plurality of means, the same in number as the number of cylinders of said diesel engine, being equidistantly spaced around an outer peripheral portion of the signal rotor, for causing the signal generator to output reference position signals when they pass it as said signal rotor rotates. For example, the reference position signal producers may simply be teeth on the rotor, of the same number as the number of cylinders of the diesel engine and equidistantly spaced around the rotor; or alternatively they may be notches in the outer circumferential surface of the rotor. In any case, as each of the reference position signal producers passes the signal generator, it causes the signal generator to emit a characteristic reference position signal, which is transmitted to the electronic control system and informs it that the crankshaft of the engine has reached a particular rotational position, typically one shortly before the start of fuel injection to one of the cylinders is required. From this instant, the electronic control system counts a certain proper time interval until the proper instant for the start of fuel injection, and then at this proper instant closes the electromagnetic valve for fuel spilling. Meanwhile, the electronic control system also calculates how long a time period corresponds to the proper amount of fuel to be injected into the cylinder in this fuel injection spirt, based upon the current revolution speed of the diesel engine, and then counts this time period until the proper instant for the end of fuel injection. At this proper instant, then, the control system opens the electromagnetic valve for fuel spilling, and thus terminates fuel injection.

However, a problem has occurred with this construction, as follows. Since the desired proper amount of fuel to be injected into the cylinder in this fuel injection spirt, which is calculated by the control system based upon certain engine operational parameters, is expressed as a time period which is calculated as based upon the revolution speed of the diesel engine, or rather on a revolution speed value which was determined at some time in the near past, thus when the engine rotational speed is quickly changing, as during acceleration or deceleration, it becomes impossible to inject the correct amount of diesel fuel, and the proper operation of the engine becomes very difficult. This problem can deteriorate the fuel economy of the diesel engine, and also and particularly can deteriorate the quality of the exhaust emissions of the engine.

SUMMARY OF THE INVENTION

Accordingly, it is a general object of the present invention to provide a diesel fuel injection pump, which can allow for very good and accurate control of the amount of diesel fuel injected to the cylinders of the engine in each fuel injection spirt.

It is a more particular object of the present invention to provide a diesel fuel injection pump which is of the abovementioned electronic spill control type and which can efficiently accomplish the abovementioned general object of the present invention.

It is a further object of the present invention to provide such a diesel fuel injection pump, which can allow for good control of the amount of diesel fuel injected to the cylinders of the engine in each fuel injection spirt, even when the engine rotational speed is changing very quickly.

It is a further object of the present invention to provide such a diesel fuel injection pump, which can allow for good control of the amount of diesel fuel injected to the cylinders of the engine in each fuel injection spirt, even when the engine is being accelerated or decelerated.

It is a further object of the present invention to provide such a diesel fuel injection pump, in which the amount of fuel to be injected in each fuel injection spirt is, at least primarily, not expressed in terms of time.

It is a further object of the present invention to provide such a diesel fuel injection pump, with the use of which the fuel economy of the engine is good.

It is a further object of the present invention to provide such a diesel fuel injection pump, with the use of which the quality of the exhaust emissions of the engine is high.

It is a yet further object of the present invention to provide such a diesel fuel injection pump, which is compact and light in weight.

It is a yet further object of the present invention to provide such a diesel fuel injection pump, which is of a simple structure.

It is a yet further object of the present invention to provide such a diesel fuel injection pump, which is economical to manufacture.

According to the most general aspect of the present invention, these and other objects are accomplished by, for a diesel engine comprising a crankshaft and a plurality of cylinders: a fuel injection pump comprising: (a) an input shaft which is rotated in a predetermined phase relationship with said crankshaft; (b) a housing and a plunger which slides in a bore formed in said housing and is coaxial with said input shaft, a high pressure chamber being defined at an end of said plunger between it and said bore, and another end of said plunger being rotationally engaged with said input shaft but being free to move axially with respect thereto; (c) a means for communicating said high pressure chamber to inject fuel into one or another cylinder of said diesel engine, according to the rotational position of said plunger, substantially only when said plunger is axially moving so as to reduce the size of said high pressure chamber; (d) a fuel injection amount control means for selectively venting said high pressure chamber; (e) a cam plate fixedly mounted on said other end of said plunger and rotating with it, and formed with a cam protuberance; (f) a mounting member mounted to said housing so as to oppose said cam plate and a roller mounted to said mounting member so as to contact said cam plate, the combination of said cam plate and said plunger being biased towards said roller so as to be pressed against it and so as to cause said plunger to be reciprocated as it rotates by the cam action of said cam protuberance on said roller; (g) a signal motor fixedly mounted on said input shaft; (h) a signal generator mounted so as to oppose an outer peripheral portion of said signal rotor; (i) a plurality of means, the same in number as the number of cylinders of said diesel engine and equidistantly spaced around an outer peripheral portion of said signal rotor, for causing said signal generator to output reference position signals when they pass it as said signal rotor rotates; and (j) a plurality of sets, the same in number as the number of cylinders of said diesel engine and each lying on said outer peripheral portion of said signal rotor between two of said reference position signal generating means, each containing a plurality of means for causing said signal generator to output rotation position signals when they pass it as said signal rotor rotates, said rotation position signals being different from said reference position signals.

According to such a structure, since by the rotation of the signal rotor and by the passing of the reference position signal generating means and the rotation position signal generating means past the signal generator a sequence of reference position signals are caused to be generated by the signal generator, each separated from the next one by a number of rotation position signals, which are thus at a much smaller pitch than the reference position signals, thus a control system for the pump can calculate the number of rotation position signals after the reference position signal that corresponds to the desired amount of fuel injection to be provided in the upcoming fuel injection spirt, and can then count this number of rotation position signals after the reference position signal before actuating the fuel injection amount control means so as to vent said high pressure chamber and to terminate the fuel injection spirt. Thus, because the desired fuel injection amount is not expressed in terms of a time period, but instead in terms of a particular integral number of rotation position signals (in fact a remainder small portion of the fuel injection amount, i.e. the fractional amount thereof, may be expressed in terms of a time period, but this is inconsiderable), change in the rotational speed of the diesel engine will not affect the amount of diesel fuel which is injected. According to this concept, therefore, good control of the amount of diesel fuel injected to the cylinders of the engine in each fuel injection spirt is available, even when the engine is being accelerated or decelerated. This therefore improves the fuel economy of the diesel engine and improves the quality of its exhaust emissions. Also, because only one signal rotor and one signal generator are utilized, the construction is kept simple and compact; and accordingly size, weight, and cost of the fuel injection pump also are minimized.

Further, according to a particular special feature of the present invention, there may be provided a means for changing the timing of said pump by altering the angular position of said mounting member with respect to said housing; and said signal generator may be mounted to said mounting member. This means that the changing of the timing of the diesel engine does not disturb the signals being outputted from the signal generator, and does not disturb the fuel injection amount.

BRIEF DESCRIPTION OF THE DRAWINGS

The present invention will now be shown and described with reference to the preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENT

Figure 1:
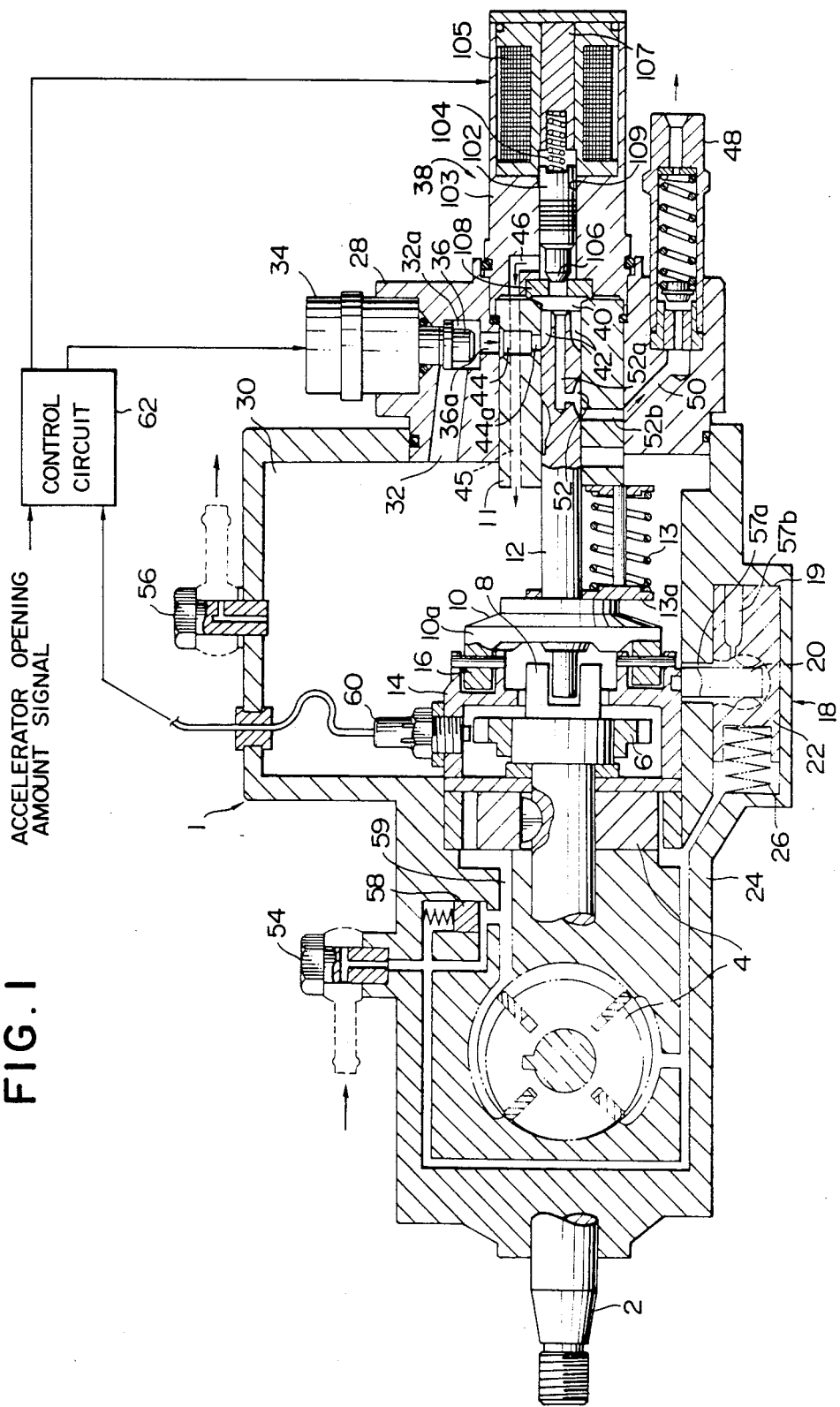
FIG. 1 is a sectional longitudinal view, in part 90° expansion, of the preferred embodiment of the diesel fuel injection pump of the present invention.

The present invention will now be described with reference to the preferred embodiment thereof, and with reference to the appended drawings. Referring to FIG. 1, this diesel fuel injection pump 1 is an electromagnetic spilling type distribution type fuel injection pump, and comprises a drive shaft 2 adapted to be driven by a crankshaft, not shown, of a diesel engine, also not shown, in a predetermined phase relationship thereto. The diesel engine to which this exemplary preferred embodiment is to be fitted is a four cylinder four stroke diesel engine. The drive shaft 2 drives a vane type feed pump 4 (shown in a plane section in FIG. 1 which is at 90° to the general plane of the figure), which feeds diesel fuel supplied via a fuel supply connection 54 and, by the control of a venting pressure control valve 58, under a moderate pressure (which is representative of the rotational speed of said vane pump 4 and thus of the rotational speed of the drive shaft 2 and of the diesel engine) through a passage 59 to a large fuel chamber 30 defined within the housing 24 of the fuel injection pump 1, fuel in said large fuel chamber 30 being vented, when appropriate, via a fuel return connection 56 incorporating a proper orifice passage. The drive shaft 2 has mounted at an intermediate position on it a signal rotor 6, having a plurality of teeth formed thereon, which will be more particularly described later with regard to its configuration and function, and is at its right end in the figure formed with a coupling shape 8. An electromagnetic pickup 60 is mounted to a roller ring 14 described later in the housing 24 opposing the teeth of the signal rotor 6 for producing electrical signals regarding the angular position of the drive shaft 2 when the teeth of said rotor 6 pass it, as also more particularly described later. A generally cylindrical plunger 12 is mounted with its central axial line coincident with the central axis of the drive shaft 2, and its left end in the figure is formed in a coupling shape which fits together with the coupling shape 8 of the drive shaft 2 so that the plunger 12 is rotationally coupled to the drive shaft 2 while being free to move axially with respect thereto. The cylindrical right end in the figure of the plunger 12 is closely and cooperatingly fitted into a cylindrical bore formed in a boss portion 11 fitted in the pump housing 24 and can slide and rotate freely in said bore; and the plunger 12 is biased to the left in the figure by a compression coil spring 13 and a collar 13a fitted on a lange shaped portion 12a of the drive shaft 2 and associated spring receiving elements, etc.

A cam plate 10 is fixedly secured around the left hand end in the figure of the plunger 12 and rotates integrally therewith, and the left hand side of this cam plate 10 is formed in an axial circular cam shape bearing a plurality of convex and concave cam portions, the convex ones being designated in the figure by the symbol 10a. The roller ring 14, which as mentioned above supports the electromagnetic pickup 60, is rotatably mounted to the housing 24 of the fuel injection pump, around the coupling shape 8 and mutually concentric therewith, and is provided with a plurality of cam rollers 16 rotatably mounted along the outer circumferential part of its right hand side in the figure, bearing against the cam plate 10, with the central rotational axis of each of said cam rollers 16 extending radially perpendicular to the central axis of the drive shaft 2. The number of the cam rollers 16 and the number of the convex cam portions 10a are such that, as the plunger 12 and the cam plate 10 rotate through one full revolution with respect to the roller ring 14, the cam action of the cam portions 10a on the rollers 16 causes the plunger 16 to be reciprocated axially to and fro by the same number of times as the number of cylinders of the diesel engine. Thus, in the shown exemplary preferred embodiment which is a fuel injection pump for a four cylinder diesel engine, there are provided four equally spaced cam rollers 16 and four equally spaced convex cam portions 10a (although some of both of these are not visible in the figure). The roller ring 14 is rotatably mounted to the pump housing 24, and its angular position is variably controlled with respect thereto by a timer 18, schematically shown in a plane section at 90° to the general plane of the figure, and this timer 18 comprises a timer piston 22 slidably mounted in a bore formed in the pump housing 24 and a pin 20 radially mounted to the roller ring 14 and engaged at its free end portion with the timer piston 22 so as to be rotationally turned and to rotationally position said roller ring 14. The timer piston 22 is biased in its rightwards axial direction in the figure as viewed in said 90° turned plane section by a compression coil spring 26 mounted between its left hand end in the figure and the corresponding end of its bore, and is biased in the leftwards axial direction by the output pressure of the vane pump 4, which is supplied via passages 57a and 57b to a chamber 19 defined at the right hand end in the figure of said bore, in such a manner that the axial movement of the timer piston 22 leftward in the figure is representative of the rotational speed of the crankshaft of the engine, and drives the roller ring 14 to rotate it in the direction opposite to the rotational direction of the drive shaft 2 so as to advance the fuel injection timing by an amount determined by the output pressure of the vane pump 4, i.e. determined by the revolution speed of the crankshaft of the diesel engine.

A control circuit 62 for the fuel injection pump 1 comprises a microcomputer, not particularly shown in detail, which has a central processing unit (CPU), a read only memory (ROM), a random access memory (RAM), and so on. The read only memory (ROM) has permanently stored in it a control program concerning fuel injection amount and so on, which includes several subroutines which will be described later. The control circuit 62, as a whole, receives (among other signals) a signal representative of accelerator opening amount, which is obtained from a sensor not shown in the figure, and may also receive an independent signal representative of engine rotational speed, and also receives the output electrical signal from the pickup 60 described earlier, and performs control of fuel injection amount and other matters according to these signals as will be described hereinafter, by supplying control electrical signals to electromagnetic valves 34 and 38 which will be described hereinafter.

On the right hand side in FIG. 1 of the fuel injection pump 1 there is mounted in the housing 24 a block 28, in which the aforementioned boss 11 is fitted. A fuel passage 32 leads from the large fuel chamber 30 to an intermediate fuel chamber 32a defined within the block 28, and a passage 44 leads from said intermediate fuel chamber 32a to a fuel supply port 44a which opens in the side surface of the cylindrical bore in the boss 11 in which the plunger 12 reciprocates. An electromagnetic valve 34 for fuel shutting off is provided, and a valve element 36 of this valve 34 is so constructed and arranged that: when the solenoid coil (not particularly shown) of the electromagnetic valve 34 is supplied with actuating electrical energy, its valve element 36 is moved upwards in the figures away from the upper end 36a of the passage 44, thus opening said upper end 36a and allowing communication between the passage 32 and the passage 44; but, on the other hand, when said solenoid coil of this electromagnetic valve 34 for fuel shutting off is not supplied with actuating electrical energy, its valve element 36 is moved downwards by the action of a spring (likewise not shown) towards said upper end 36a of the passage 44 and blocks it, thus interrupting communication between the passage 32 and the passage 44.

The outer cylindrical surface of the right hand end of the plunger 12 is formed with a plurality of axially extending grooves 42, which are equally spaced around said plunger 12 and reach its end and whose number is the same as the number of cylinders of the diesel engine and which are arranged sometimes one or other to coincide with the fuel supply port 44a, according to rotation and reciprocation of the plunger 12; and a central axial hole 52a is formed along the axis of said plunger 12, one end of said hole 52a opening to the right hand end surface of the plunger 12 and the other end of said hole 52a opening to a side notch port 52 provided on the outer cylindrical surface of an intermediate portion of the plunger 12. A plurality of delivery valves 48 in number the same as the number of cylinders of the diesel engine are mounted in the block 28 (only one of the valves 48 with its associated arrangements is shown in FIG. 1 for the purposes of simplicity), and the inlet of each of these delivery valves 48 is selectively supplied with diesel fuel via a passage 50 which leads to a fuel receiving port 52b which opens in the side surface of the cylindrical bore in the boss 11 in which the plunger 12 reciprocates; the ports 52b are equally spaced around the plunger 12 and also are in number the same as the number of cylinders of the diesel engine, i.e. are four in number in this preferred embodiment. Although it is not so shown in the figures, in fact each of the delivery valves 48 is connected via a high pressure fuel pipe to a fuel injector fitted in a corresponding one of the cylinders of the diesel engine, for supplying diesel fuel under high pressure thereto at an appropriate amount and timing. The side notch port 52 is arranged to sometimes coincide with one or other of the fuel receiving ports 52b, also according to rotation and reciprocation of the plunger 12.

A high pressure chamber 40 is defined between the right hand end of the plunger 12 and an electromagnetic valve for fuel spilling 38 fitted to the block 28 and closing the end of the cylindrical bore in the boss 11 in which said plunger 12 reciprocates, in cooperation with the cylindrical side surface of said bore, with the ends of the notches 42 and the end of the central hole 52a in the plunger 12 communicating to this high pressure chamber 40; and this electromagnetic valve for fuel spilling 38 regulates escape of fluid from the high pressure chamber 40. The fuel vent passage 46 of this electromagnetic valve for fuel spilling 38 is communicated, via an intermediate passage 45 formed in the boss 11, to the large fuel chamber 30.

The electromagnetic valve for fuel spilling 38 comprises a housing 103 in which the return passage 46 mentioned above is formed, and an iron core 107 is fitted in this housing 103 and has an electromagnetic coil 105 wound around it. A cylindrical bore 109 of relatively large diameter formed in the valve housing 103 has a cylindrical valve element 102 fitted therein so as to be reciprocable along the axis thereof. The valve element 102 has a relatively thin left hand end tip 106, which cooperates with a hole formed in a valve seat member 108 so as selectively to close or to open said hole, according as said valve element 102 is pushed thereagainst, or not, respectively. A compression coil spring 104 is fitted between the iron core 107 and the right hand end of the valve element 102, so as to bias the valve element 102 leftwards as seen in the figure, against said hole in said valve seat member 108. The space to the right of the valve seat member 108 is communicated to the upstream end of the return passage 46, and the left side in the figure of the valve seat member 108 defines the right side of the high pressure chamber 40.

Thus, when no electrical energy is supplied to the coil 105, then the iron core 107 is not magnetized, and thus the compression coil spring 104 biases the valve element 102 leftwards in the figure, so that the end 106 thereof closes the hole in the valve seat member 108, and this seals off the high pressure chamber 40 from the return passage 46. On the other hand, when actuating electrical energy is supplied to the coil 105, then the iron core 107 is magnetized, and then against the biasing action of the compression coil spring 104 which is overcome the valve element 102 is pulled thereby rightwards in the figure, so that its end opens the hole in the valve seat member 108, and this opens a passage from the high pressure chamber 40 to the return passage 46, allowing a flow of fluid out from the pressure chamber 40 and depressurizing said pressure chamber 40.

Figure 2:
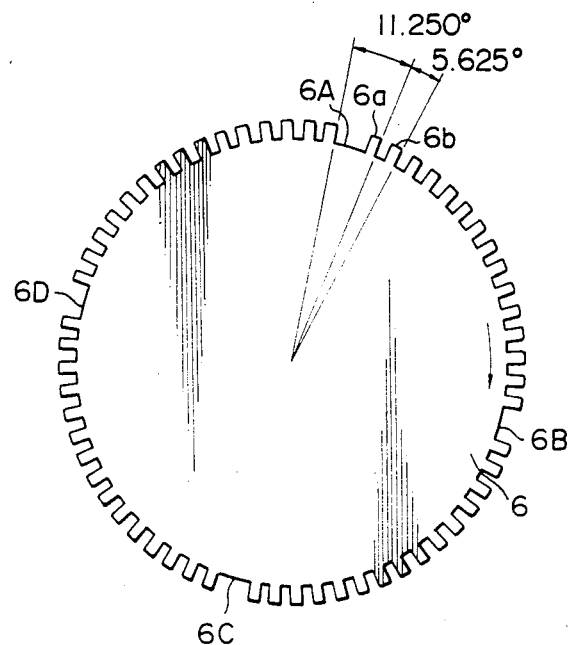
FIG. 2 is a plan view of a signal rotor which is an essential part of said preferred embodiment.

The signal rotor 6 of this preferred embodiment is more particularly shown in plan view in FIG. 2. Here it is seen that said signal rotor 6 is formed with a number of projecting teeth 6a, 6b, . . . , and has four (corresponding to the four cylinders of the diesel engine) large notches 6A, 6B, 6C, and 6D defined between four groups of these teeth 6a, 6b, . . . , with these notches 6A, 6B, 6C, and 6D being spaced equidistantly around the periphery of the signal rotor 6, i.e. at 90° apart. The teeth 6a, 6b, etc., of each of these four groups are mutually separated by smaller notches all of the same width, and in the shown exemplary embodiment fifteen teeth are provided in each group of teeth defined between each adjacent pair of the large notches 6A, 6B, etc. (although of course this is not an absolute requirement but is a matter of design choice) with the angular position between adjacent teeth being a standard angle of, in this case, 5.625°. Thus, in this exemplary case, the size of the larger notches 6A through 6D is as though there was one tooth missing at each of them from a complete and regular toothed wheel, and also the angular width of each tooth is approximately the same as that of the smaller notches between the teeth; and therefore the width of the teeth and of the smaller notches is about 2.8125° and the width of the larger notches 6A through 6D is about 8.4375°. And, as the signal rotor 6 rotates, and as each of its teeth 6a, 6b, etc., passes the sensor 60 in turn, an electrical signal is generated (due to electromagnetic induction in the particular construction of this preferred embodiment, but it could be otherwise arranged) as an output signal from said sensor 60 by this passing, to form as a whole an output waveform as shown schematically in FIG. 3, with the wide portions thereof about three times the length of the narrow portions.

Figure 3:
FIG. 3 is a wave form diagram of the pulse signal which is obtained from a pickup sensor of said preferred embodiment by using the signal rotor of FIG. 2.

Thus, the larger notches 6A, 6B, 6C, and 6D serve as reference position signal generating means, and as each of them passes the sensor 60 it causes to be outputted therefrom an output electrical signal of a considerable length, which signals to the control circuit 62, as will be more particularly explained later, that the next one of the cylinders of the diesel engine is at a particular critical point in its cycle. On the other hand, the smaller notches between the teeth 6a, 6b, etc., serve as rotational signal generating means, and as each of them passes the sensor 60 it causes to be outputted therefrom an output electrical signal of a much smaller length, about a third as long in this exemplary case. Thus, the composite waveform output from the sensor 60 is as shown in FIG. 3, with fourteen shorter pulses (corresponding to the fourteen shorter notches between the fifteen teeth of each group) between each longer pulse (corresponding to the larger notches 6A, . . . 6D). In fact, in alternative embodiments, the reference position signal generating means and the rotational signal generating means could be anything, as long as they caused distinguishable signals to be outputted from the sensor 60 as they passed it; for example the reference position signal generating means could be wide teeth (as opposed to notches as in this embodiment) and the rotational signal generating means could be narrow teeth, or alternatively the reference position signal generating means could be wide permanent magnets and the rotational signal generating means could be narrow permanent magnets.

Now, the action of this fuel injection pump 1 during operation of the diesel engine will be described. When the engine is running and the crankshaft (not shown) of said engine is rotating, the drive shaft 2 is rotated in synchronism therewith and at a predetermined phase in relation thereto (actually at half crankshaft speed, because this is exemplarily a pump for a four stroke diesel engine), and drives the vane pump 4, and fuel pressurized to the output pressure of said vane pump 4, which is representative of the rotational speed of said drive shaft 2 and of said crankshaft of the engine, is fed into the chamber 30 and into the fuel passages 32 and 44 and also into the actuating chamber 19 of the timer assembly 18, so as to cause the timer piston 22 to be driven leftwards in the figure (90° plane section) by an amount corresponding to said rotational speed of said engine, thus rotating the roller ring 14 and the rollers 16 mounted thereon by a similarly corresponding amount from their starting rotational positions relative to the housing 24 in the direction opposite to the rotational direction of the drive shaft 2. Meanwhile, as the drive shaft 2 and the plunger 12 rotate in synchronism with one another, and as the cam plate 10 is also rotated, the cam projections 10a are caused to ride up and down the rollers 16, so as to reciprocatingly drive the plunger 12 against the biasing force of the compression coil spring 13 leftwards and rightwards in the figure at appropriate timing governed by the aforesaid rotational position of the roller ring 14, as said plunger 12 also rotates, i.e. according to the rotational speed of the diesel engine, with the plunger 12 making one complete rotation for every two rotations of the crankshaft of the diesel engine, in this case of a four stroke type diesel engine. While the master running or ignition switch of the vehicle is turned on while the diesel engine is running, actuating electrical energy is being supplied to the electromagnetic valve 34 for fuel shutting off, and so its valve element 36 is displaced from the valve seat 36a and the fuel passage 32 is in communication with the fuel passage 44. Therefore, on each of the suction or leftward strokes of the plunger 12 when one of the notches 42 is corresponding to the fuel supply port 44a which opens in the side surface of the cylindrical bore in the boss 11, diesel fuel at relatively low pressure is sucked into the high pressure chamber 40 from the chamber 30 through said fuel passages 32 and 44.

When thereafter the plunger 12 moves rightwards during its subsequent compression stroke, by the rotation of said plunger 12 said one of the notches 42 is no longer corresponding to the fuel supply port 44a, and accordingly back flow of diesel fuel to the passage 44 is prevented; and also the side notch port 52 is now coinciding with an appropriate one of the fuel receiving ports 52b, also according to rotation of the plunger 12, so as to direct diesel fuel which is now being compressed in the high pressure chamber 40 by the rightward movement of the plunger to the appropriate one of the fuel delivery valves 48, via the hole 52a and said side notch port 52, so as to be injected into the appropriate cylinder of the engine (not shown) via the relevant fuel injection valve, according to the per se well known distribution function of this fuel injection pump. However, this compression process of the diesel fuel within the high pressure chamber 40, and the injection thereof through the fuel delivery valve 48, only will take place if the coil 105 of the electromagnetic valve for fuel spilling 38 is not being provided with actuating electrical energy and thus said valve 38 is closed and is preventing communication between the high pressure chamber 40 and the vent passage 46. On the other hand, when actuating electrical energy is provided to said coil 105 of the valve 38, then the tip of the valve element 102 is displaced from the hole in the valve seat member 108 as explained above, thus opening said hole, and thereby the high pressure chamber 40 is communicated with the vent passage 46, thus venting the compressed diesel fuel in the chamber 40 back to the large fuel chamber 30 to which said vent passage 46 communicates, and thereby cutting off fuel injection. During normal running of the diesel engine, the control circuit 62 supplies actuating electrical energy to the electromagnetic valve for fuel spilling 38 at an appropriate timing point during each fuel injection stroke of the plunger 12, so as to open said valve 38 and to cut off further fuel injection during this plunger stroke, according to the various signals regarding engine operational parameters which said control circuit 62 receives from its various sensors such as the sensor 60, and according to accelerator pedal depression amount, as will shortly be described: this is how the amount of fuel injectingly supplied to the diesel engine, and thereby the load on said diesel engine, is controlled. This action of the control circuit 62 in venting the high pressure chamber 40 at an appropriate timing point is analogous to the operation of a spill ring in a conventional type of diesel fuel injection pump. When the diesel engine is running and it is desired to stop it from running, the master running switch of the vehicle is turned off by the operator, and this immediately causes stopping of supply of electrical energy to the electromagnetic valve 34 for fuel shutting off, so that its valve element 36 is moved against the valve seat 36a by the force its biasing spring (not particularly shown) and communication between the fuel passage 32 and the fuel passage 44 is interrupted. Therefore, supply of new fuel to the diesel engine is terminated, and accordingly quickly the diesel engine comes to a halt.

Figure 4:
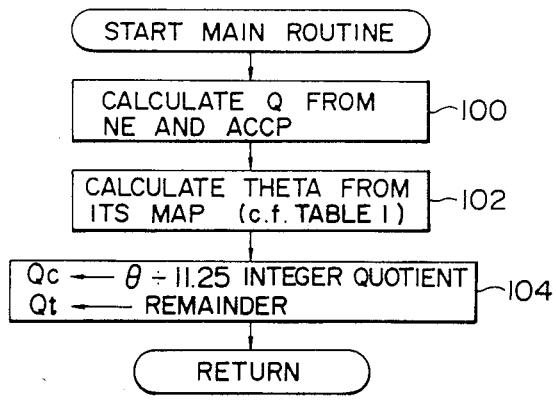
FIG. 4 is a flow chart showing a main fuel injection control routine stored in a microcomputer incorporated in the control system of this preferred embodiment.
Figure 5:
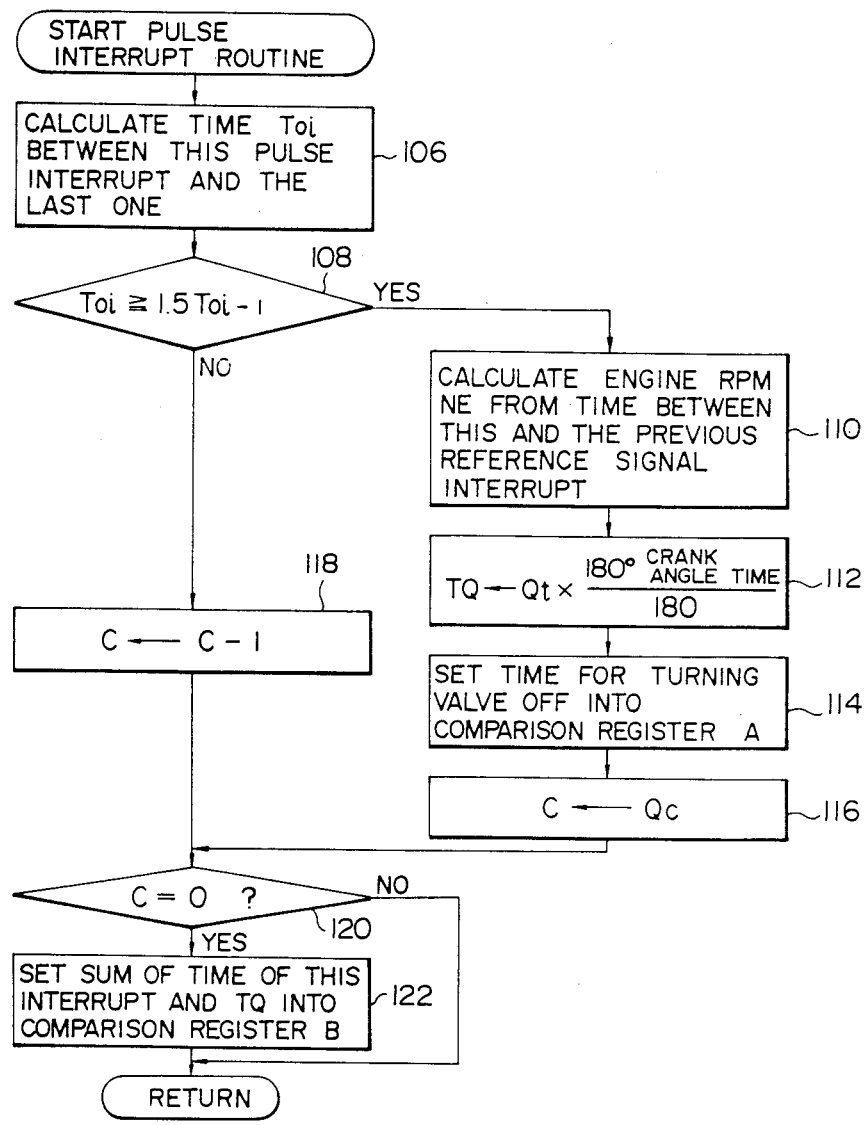
FIG. 5 is a flow chart showing a pulse interrupt subroutine stored in said microcomputer.
Figure 6:
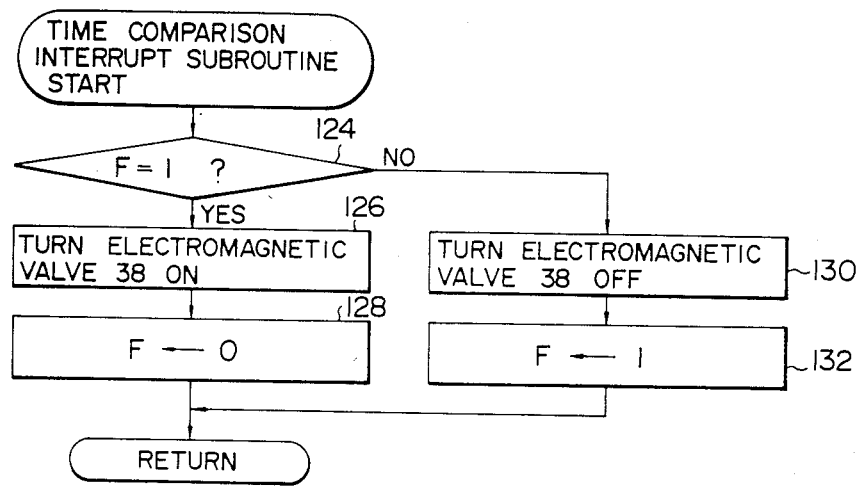
FIG. 6 is a flow chart showing a time comparison interrupt subroutine stored in said microcomputer.

Now, how the microcomputer incorporated in the control circuit 62 determines the amount of fuel to be injected in each injection spirt to each cylinder of the engine, in other words how said microcomputer determines the time for energizing the electromagnetic valve for fuel spilling 38 so as to terminate each spirt of fuel injection, will be particularly described, with reference to the flow charts of FIGS. 4, 5, and 6, and with reference to the interpolation table shown in Table I.

FIG. 4 shows the flow chart of the main fuel injection program of this microcomputer. In the step 100 of this program, from the engine rotational speed NE computed in the step 110 of the interrupt routine of FIG. 5 and from the accelerator pedal opening amount ACCP as detected by the accelerator pedal opening amount sensor (not particularly shown), the basic fuel injection amount Q is calculated in the following way. In idling range, the fuel injection amount QIDLE=KI−NE/KIC, where KI=1.75×ACCP+79.0, and KIC=10. And in partial and total load ranges, the fuel injection amount QPART=KPA−NE/KPB, where, if ACCP is between 0% and 20%, KPA=1.56×ACCP+20 and KPB=1.94×ACCP+50, while, if ACCP is between 20%, and 100%, KPA=1.314×ACCP+45 and KPB=2.18×ACCP+45.2.

Then, in the step 102 of the program, corresponding to the current engine rotational speed NE and the desired fuel injection amount Q, a spill angle THETA is calculated, by interpolation from a table of THETA against engine rotational speed NE and desired fuel injection amount Q stored in the ROM of the microcomputer: an example of such an interpolation table or map is given in Table I, which is located at the end of this specification and before the claims thereof. Table I is a tabular map for interpolation, showing the relationship of spill angle or fuel injection end time to engine rotational speed and to desired fuel injection amount, and in this table the standard spill angle is taken as 54° BTDC. (Although the instant for spilling of the fuel from the high pressure chamber 40, i.e. the fuel injection end time, is herein spoken of and calculated in terms of a so called spill angle THETA, as in the case of a conventional fuel injection pump including a spill ring, this spilling is of course performed electronically).

Next, in the step 104 of this program, this spill angle THETA is divided by the angle between the teeth of the rotor 6 (that is, the smaller angle between the teeth of each group, i.e. by 2.8125°, and the integer quotient portion of the result is stored in the storage location Qc of the RAM, while the remainder is stored in the storage location Qt. Then the main fuel injection amount calculation program returns.

In FIG. 5, there is shown the flow chart of a pulse interrupt subroutine for the microcomputer incorproated in the control circuit 62, which is performed on the occasion of an interrupt occurring each time the pulse signal from the sensor 60 rises from the low state. In this pulse interrupt subroutine, in the step 106 the time interval Toi is calculated between this pulse interrupt and the last one. Then, in the step 108, a decision is made as to whether this pulse interrupt time interval is greater than or equal to 1.5 times the last such pulse interrupt time interval. If it is, then it is judged that this last pulse quiescent period was long enough to definitely correspond to a reference position signal, i.e. that the period of low pulse output which has just concluded from the sensor 60 was being caused by the passage of one of the larger notches 6A through 6D past said sensor 60, and control is transferred to the step 110. If on the other hand this pulse interrupt time interval is judged not to be due to the passage of one of the larger notches 6A through 6D past the sensor 60, then control passes to the step 118, and the value of a counter C is decremented by one, and then control passes to the step 120.

In the step 110, once that it is determined that a reference position signal has just at this time been generated by the rotor 6, the engine rotational speed NE is computed from the difference between the present time and the last time that such a reference position signal was generated (which corresponds, in this embodiment, to 90° of rotation of the shaft 2 of the diesel fuel injection pump 1 or to 180° of rotation of the engine crankshaft). Then, in the step 112, the time required for the engine crankshaft to make 1° of rotation is calculated from this engine rotational speed NE, and the remainder Qt from the division of the desired spill angle THETA by the angle between successive teeth of the rotor 6, computed in the step 104, is converted into a time equivalent value, and is stored in the RAM at location TQ.

Next, in the step 114, a compare register A, which is used for holding the value of time when it is desired than an interrupt should be caused for the interrupt subroutine of FIG. 6 to be initiated and for the electromagnetic valve for fuel spilling 38 to be turned OFF, i.e. deenergized, is set to the present time plus a characteristic time value corresponding to the time required for the crankshaft of the engine to rotate from the present position (at which the reference signal has just been generated by one of the large notches passing the sensor 60) to its position at which fuel injection start is required. A call to the interrupt routine of FIG. 6 will naturally subsequently occur, when the value of time becomes equal to this time set in the register A, and the valve 38 will be turned OFF at that time so as to start fuel injection by commencing to pressurize the high pressure chamber 40. And next, in the step 116, the initial value of the count variable C (decremented in step 118 described above) is set to be equal to the integer quotient portion Qc of the result of the division of the desired spill angle THETA by the angle between successive teeth of the rotor 6 computed in the step 104.

In the step 120, to which both branches of this subroutine converge, a test is made as to whether the value of the counter C has reached zero or not, and if it has not then this interrupt subroutine directly returns, while if it has (indicating that a number of teeth equal to the value Qc has just now passed the sensor 60 since the last reference position signal, i.e. since the last large notch 6A, 6B, 6C, or 6D), then in the step 122 another compare register B, which is used for holding the value of time when it is desired that an interrupt should be caused for the interrupt subroutine of FIG. 6 to be initiated and for the electromagnetic valve for fuel spilling 38 to be turned ON, i.e. energized, is set to the present time plus the extra time period TQ calculated in the step 112. A call to the interrupt routine of FIG. 6 will naturally subsequently occur, when the value of time becomes equal to this time set in the register B, and the valve 38 will be turned ON at that time so as to end fuel injection by ceasing to pressurize the high pressure chamber 40. Finally, this interrupt subroutine returns.

In FIG. 6, there is shown the flow chart of a time comparison interrupt subroutine for the microcomputer incorporated in the control circuit 62, which is performed on the occasion of an interrupt occurring each time the current value of time becomes equal to the time value set in the register A or that st in the register B. In this time comparison interrupt subroutine, first in the step 124 a decision is made as to whether the value of a flag F, which is set to 0 or 1 respectively to indicate whether or not the electromagnetic valve 38 for fuel spilling is being energized, is currently 1 or not; if the value of this flag F is currently 1, indicating that the valve 38 is currently OFF, then the flow of control is passed to the step 126, in which the valve 38 is turned ON (i.e. an electrical signal is sent to a control relay or the like for energizing said fuel spilling valve 38 and thus for depressurizing the high pressure chamber 40 and for thus terminating this current fuel injection episode), and then in the step 128 the flag F is set to 0 to indicate that the valve 38 is now ON and the routine returns; whereas, if the value of the flag F is currently 0, indicating that the valve 38 is currently ON, then the flow of control is passed to the step 130, in which the valve 38 is turned OFF (i.e. an electrical signal is sent to said control relay or the like for deenergizing said fuel spilling valve 38 and thus for repressurizing the high pressure chamber 40 and for thus starting the next fuel injection episode), and then in the step 132 the flag F is set to 1 to indicate that the valve 38 is now OFF, and again the routine returns. Thus, this routine serves to reverse the state of energization or deenergization of the electromagnetic valve 38 for fuel spilling, whenever the value of time becomes equal to the time value stored in the register A or that stored in the register B.

Figure 7:
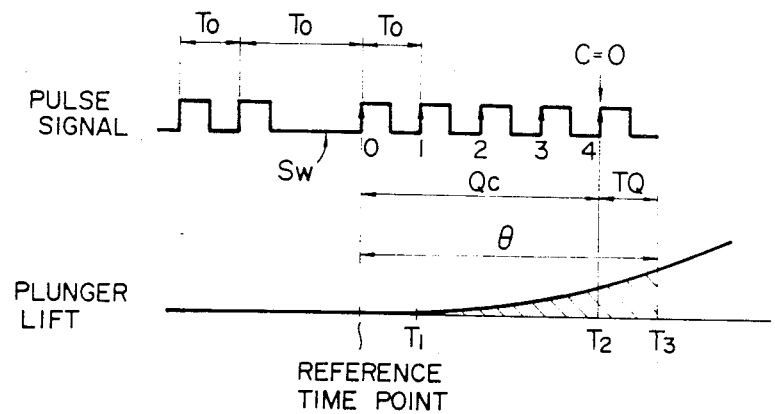
FIG. 7 is a diagram for explaining the fuel injection amount and timing provided by this preferred embodiment of the diesel fuel injection pump of the present invention.

Now, with reference to FIG. 7, the effect of these programs in providing fuel injection will be explained. The point of rising of the pulse signal from the sensor 60 after the wide pulse width signal Sw (as determined in the step 108) is taken as the reference time point, and at this moment the engine revolution speed is calculated, in the step 110, and also in the step 112 the residual time TQ required for fuel injection (after Qc pulse widths) is calculated, and also in the step 114 the register A is set to the time point (T1 in FIG. 7) at which it is required that the electromagnetic valve for fuel spilling 38 should be closed (i.e. deenergized) in order to start fuel injection-this will be performed by the routine of FIG. 6 being naturally initiated by an interrupt, when time becomes equal to this time value T1 in the register A. From now, the ordinary type pulse signals are counted from this time point on (by decrementing the count C in the step 118 of the routine of FIG. 5, every time this routine is called as an interrupt routine by the value of the pulse signal rising) until the number that have occurred becomes equal to the integer quotient value Qc determined in the step 104 of the main fuel amount calculation routine. At this time point (T2 in FIG. 7) in the step 122 the register B is set to the time point (T3 in FIG. 7), equal to the present time plus the residual time TQ, at which it is required that the electromagnetic valve for fuel spilling 38 should be opened (i.e. energized) in order to end fuel injection-again, this will be performed by the routine of FIG. 6 being naurally initiated by an interrupt, when time becomes equal to this time value T3 in the register B. Thereby, an amount Q of diesel fuel as indicated by the shaded area is injected through the valve 48 by being pressurized by the plunger 12, i.e. between the time points T1 and T3 determined as described above.

Because this control of the opening of the electromagnetic valve 38 for fuel spilling is made by counting the proper number of the rotational angle signals emitted by the sensor 60 from the time that the reference angle signal is emitted by said sensor, and only the residual or fractional part of the time period for fuel injection is made by calculating a time period therefor (the period TQ) and by observing the passage of this time period, thereby the accuracy of fuel injection is very much improved according to this control method, as compared to the prior art in which the entire fuel injection amount was calculated in terms of the time period necessary therefor, in other words the spill angle THETA was converted into a time period, and then the passage of this much longer time period was observed. Especially if the revolution speed of the diesel internal combustion engine is changing very rapidly, the accuracy of the present method is particularly distinguished, because according to it change in the rotational speed of the diesel engine will not affect the amount of diesel fuel which is injected. According to this concept, therefore, good control of the amount of diesel fuel injected to the cylinders of the engine in each fuel injection spirt is available, even when the engine is being accelerated or decelerated. This therefore improves the fuel economy of the diesel engine, and improves the quality of its exhaust emissions. Also, because only one signal rotor and one signal generator are utilized, the construction is kept simple and compact; and accordingly size, weight, and cost of the fuel injection pump also are minimized.

Also, because the sensor 60 is mounted to the roller ring 14, and rotates therewith when the timer 18 alters the timing of fuel injection according to the revolution speed of the diesel engine, thereby no problems arise with regard to this timing alteration disturbing proper counting of pulses or the like from the sensor 60, because the changing of the timing of the diesel engine does not disturb the signals being outputted from the signal generator, and does not disturb the fuel injection amount. This is an important specialization of the present invention.

Although the present invention has been shown and described with reference to the preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

TABLE I

| Q | \multicolumn{13}{c}{NE} |
|---|---|---|---|---|---|---|---|---|---|---|---|---|---|
|   | 0 | 400 | 800 | 1200 | 1600 | 2000 | 2400 | 2800 | 3200 | 3600 | 4000 | 4400 | 4800 |
| 0 | 49.6 | 47.3 | 42.0 | 39.0 | 35.9 | 31.5 | 27.8 | 24.8 | 22.5 | 20.3 | 18.0 | 15.0 | 11.3 |
| 5 | 52.7 | 49.9 | 48.0 | 44.8 | 41.4 | 39.8 | 37.1 | 35.5 | 33.2 | 31.0 | 30.0 | 26.5 | 25.5 |
| 10 | 55.1 | 51.8 | 49.5 | 47.1 | 44.5 | 41.3 | 39.0 | 38.3 | 36.0 | 34.5 | 33.0 | 30.8 | 27.0 |
| 20 | 58.5 | 54.2 | 52.5 | 50.8 | 48.8 | 45.0 | 43.5 | 42.0 | 39.8 | 38.5 | 38.4 | 36.8 | 35.3 |
| 30 | 59.9 | 57.9 | 55.7 | 53.3 | 51.8 | 48.8 | 46.5 | 44.3 | 44.0 | 43.5 | 42.8 | 42.0 | 41.5 |
| 40 | 62.1 | 61.1 | 58.5 | 57.6 | 54.8 | 52.5 | 50.4 | 48.0 | 46.6 | 46.0 | 45.3 | 45.3 | 45.0 |
| 50 | 64.9 | 64.5 | 62.4 | 60.2 | 57.2 | 56.3 | 54.0 | 51.8 | 50.3 | 48.8 | 48.0 | 47.3 | 47.5 |
| 60 | 69.9 | 69.4 | 67.5 | 63.7 | 62.3 | 59.3 | 57.8 | 56.3 | 54.0 | 53.3 | 51.8 | 51.8 | 51.2 |

(standard position 54° BTDC)

What is claimed is:

1. A distribution type fuel injection system for an internal combustion engine having a crankshaft and a plurality of cylinders, the fuel injection system comprising:
    an input shaft mounted for rotation in a predetermined phase relationship with said crankshaft;
    a housing having a bore formed therein coaxial with said input shaft;
    a plunger slidably arranged in said bore, the plunger having a first end which defines a high pressure chamber in said bore, and a second end which is rotationally engaged with said input shaft while being free to move axially with respect thereto;
    a combination of a cam plate and a cam follower incorporated between said input shaft and said plunger to drive said plunger in a first axial direction to reduce the size of said high pressure chamber in a first group of certain spaced rotational phases of said input shaft and a spring which biases said plunger in a second axial direction opposite to said first axial direction to increase the size of said high pressure chamber in a second group of certain spaced rotational phases, each rotational phase of said second group being located between corresponding two adjacent ones of said first group of rotational phases;
    means for communicating said high pressure chamber with a source of fuel when said plunger is moving in said second axial direction and for communicating said high pressure chamber with successive ones of said plurality of cylinders when said plunger is moving in said first axial direction;
    a solenoid valve which selectively vents said high pressure chamber according to selective energization and deenergization thereof to control the amount of fuel supplied to respective ones of said plurality of cylinders;
    a signal rotor fixed to said input shaft for rotation therewith, said signal rotor having a plurality of signal generating means circumferentially spaced around a circular portion thereof, the spacing including a plurality of first spaces, each of said first spaces represents a predetermined unit rotational angle of said crankshaft;
    a signal pickup means for detecting each of said signal generating means as it passes a predetermined location adjacent to said circular portion of the signal rotor;
    an electronic calculating means for calculating an amount of fuel to be injected for each fuel injection according to engine rotational speed and accelerator pedal opening amount, the calculating means determining a rotational angle of said crankshaft during which said solenoid valve is closed to perform a fuel injection to a preselected cylinder, dividing said rotational angle amount by said unit rotational angle to provide a quotient in the form of an integer and a fractional remainder, calculating a unit time in each period of fuel injection for said crankshaft to rotate through said unit rotational angle according to engine rotational speed and said first space, and multiplying said unit time by said remainder to provide a fractional time amount;
    an electronic processing means for providing a start signal upon detection by said signal pickup means of a predetermined one of said signal generating means corresponding to said preselected cylinder, for counting down from the numerical value of said integer each time a subsequent signal generating means is detected by said signal pickup means until the counting down is completed, for adding said fractional time amount, and for then providing an end signal; and
    an electrical power circuit for selectively energizing and deenergizing said solenoid valve according to said start signal and said end signal so as to stop venting of said high pressure chamber from the delivery of said start signal to the delivery of said end signal.

2. A distribution type fuel injection system according to claim 1, wherein the circumferential spacing of said signal generating means around the circular portion of said signal rotor further includes a number of second spaces equal to the number of cylinders, each second space being substantially larger than said first spaces, and a plurality of third spaces equal in number to said second spaces and which are substantially smaller than said second spaces, each of said second spaces being positioned along said circular portion of said rotor at locations which indicate predetermined initial phase points of said crankshaft with respect to the corresponding cylinders, each of said third spaces being positioned next to a corresponding one of said second spaces in the direction of rotation of said signal rotor, said first spaces being positioned in a plurality of groups, each group being next to each one of said third spaces in the direction of rotation of said signal rotor, and wherein said electronic processing means actuates said electronic calculating means each time that one of said second spaces is detected by the interaction of said signal generating means and said signal pickup means to calculate said unit time, and starts said counting down each time that one of said third spaces is detected by the interaction of said signal generating means and said signal pickup means.

3. A distribution type fuel injection system according to claim 2 wherein said third spaces are equal in angular extent to said first spaces.

* * * * *

UNITED STATES PATENT AND TRADEMARK OFFICE
CERTIFICATE OF CORRECTION

PATENT NO. : 4,574,756
DATED : March 11, 1986
INVENTOR(S) : Yoshiyasu Ito, et al.

It is certified that error appears in the above-identified patent and that said Letters Patent is hereby corrected as shown below:

Column 1, line 29, between "is" and "so" insert --a--.

Column 4, line 32, after "generator" insert a comma.

Column 6, line 19, change "lange" to --flange--.

Column 8, line 65, after "come" insert a comma.

Column 9, line 22, change "was" to --were--.

Column 11, line 62, omit the comma after "20%".

Column 12, line 25, change "proated" to --porated--.

Column 13, line 40, change "that st in" to --that set in--.

Column 14, line 13, after "injection" omit the hyphen and insert a period. Start a new sentence with "This will be performed".

UNITED STATES PATENT AND TRADEMARK OFFICE
CERTIFICATE OF CORRECTION

PATENT NO. : 4,574,756
DATED : March 11, 1986
INVENTOR(S) : Yoshiyasu Ito, et al.

It is certified that error appears in the above-identified patent and that said Letters Patent is hereby corrected as shown below:

Column 14, line 28, after "injection" insert a period. Start a new sentence with "Again, this will be".

Column 14, line 29 change "naurally" to --naturally--.

Signed and Sealed this

Twelfth Day of August 1986

[SEAL]

Attest:

DONALD J. QUIGG

Attesting Officer

Commissioner of Patents and Trademarks